United States Patent
Zhang

(10) Patent No.: US 10,212,397 B2
(45) Date of Patent: Feb. 19, 2019

(54) ABANDONED OBJECT DETECTION APPARATUS AND METHOD AND SYSTEM

(71) Applicant: FUJITSU LIMITED, Kawasaki-shi, Kanagawa (JP)

(72) Inventor: Nan Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 15/222,289

(22) Filed: Jul. 28, 2016

(65) Prior Publication Data

US 2017/0032514 A1 Feb. 2, 2017

(30) Foreign Application Priority Data

Jul. 31, 2015 (CN) .......................... 2015 1 0463456

(51) Int. Cl.
*H04N 7/18* (2006.01)
*G06T 7/11* (2017.01)
(Continued)

(52) U.S. Cl.
CPC ......... *H04N 7/183* (2013.01); *G06K 9/00771* (2013.01); *G06K 9/00785* (2013.01); *G06T 7/11* (2017.01); *G06T 7/194* (2017.01)

(58) Field of Classification Search
CPC ............... H04N 7/183; G06K 9/00785; G06K 9/00771; G06T 7/11; G06T 7/194
(Continued)

(56) References Cited

U.S. PATENT DOCUMENTS

2007/0122000 A1 5/2007 Venetianer et al.
2007/0280540 A1 12/2007 Ikeda
(Continued)

FOREIGN PATENT DOCUMENTS

CN 101231696 A 7/2008
CN 101281596 A 10/2008
(Continued)

OTHER PUBLICATIONS

Chinese Office Action dated Sep. 26, 2018 in corresponding Chinese Patent Application No. 201510463456.6.
(Continued)

*Primary Examiner* — Amandeep Saini
(74) *Attorney, Agent, or Firm* — Staas & Halsey LLP

(57) ABSTRACT

An abandoned object detection apparatus and method and a system where the apparatus is configured to match each pixel of an acquired current frame with its background model, mark unmatched pixels, taken as foreground pixels, on a foreground mask, add 1 to a foreground counter to which each foreground pixel corresponds, and update the background model; for each foreground pixel, mark a point corresponding to the foreground pixel on an abandon mask when a value of the foreground counter to which the foreground pixel corresponds is greater than a second threshold value; and for each point on the abandon mask, process the abandon mask according to its background model and buffer background or foreground mask. Hence, when the abandoned object leaves and how long it stays may be judged, and interference of occlusion and ghost may also be avoided, thereby solving a problem of illegal road occupation identification.

19 Claims, 6 Drawing Sheets

301
each pixel of an acquired current frame is matched with its background model, unmatched pixels, taken as foreground pixels, are marked on a foreground mask, 1 is added to a foreground counter to which each foreground pixel corresponds, and the background model is updated 302
for each foreground pixel, a point corresponding to the foreground pixel is marked on an abandon mask when a value of the foreground counter to which the foreground pixel corresponds is greater than a second threshold value 303
for each point on the abandon mask, the abandon mask is processed according to its background model and buffer background or foreground mask

(51) Int. Cl.
*G06T 7/194* (2017.01)
*G06K 9/00* (2006.01)

(58) Field of Classification Search
USPC .......................................................... 382/103
See application file for complete search history.

(56) References Cited

U.S. PATENT DOCUMENTS

2008/0247599 A1    10/2008  Porikli et al.
2013/0051613 A1*    2/2013  Bobbitt .............. G06K 9/00771
                                                          382/103

FOREIGN PATENT DOCUMENTS

| | | |
|---|---|---|
| CN | 101777183 A | 7/2010 |
| CN | 102314695 A | 1/2012 |
| CN | 102902960 A | 1/2013 |
| CN | 103226712 A | 7/2013 |
| CN | 103714325 A | 4/2014 |
| CN | 103729858 A | 4/2014 |
| TW | 200802138 | 10/1995 |

OTHER PUBLICATIONS

Chinese Search Report dated Sep. 26, 2018 in corresponding Chinese Patent Application No. 201510463456.6.

* cited by examiner

301 each pixel of an acquired current frame is matched with its background model, unmatched pixels, taken as foreground pixels, are marked on a foreground mask, 1 is added to a foreground counter to which each foreground pixel corresponds, and the background model is updated

302 for each foreground pixel, a point corresponding to the foreground pixel is marked on an abandon mask when a value of the foreground counter to which the foreground pixel corresponds is greater than a second threshold value

303 for each point on the abandon mask, the abandon mask is processed according to its background model and buffer background or foreground mask

Fig. 3

ABANDONED OBJECT DETECTION APPARATUS AND METHOD AND SYSTEM

CROSS-REFERENCE TO RELATED APPLICATIONS

This application claims the priority benefit of Chinese Patent Application No. 201510463456.6, filed on Jul. 31, 2015 in the Chinese State Intellectual Property Office, the disclosure of which is incorporated herein in its entirety by reference.

BACKGROUND

1. Field

The present disclosure relates to the field of image processing technologies, and in particular to an abandoned object detection apparatus and method and a system.

2. Description of the Related Art

With the development of computer image processing technology, video surveillance system is widely used in intelligent transportation field. However, most researches concentrate on traffic flow detection, pedestrian tracking, violation vehicle detection, etc., and illegal road occupation recognition is not yet complete. Illegal occupation mainly includes illegal stall, stranded suspicious object, unlawful parking, etc. It can cause traffic accidents if these situations are not disposed in time. But in reality most illegal occupation inspections are by manual work, which need policemen to collect lane information from fixed points regularly. Then it will lead to waste of financial and human cost.

The research on intelligent surveillance includes target detection, target tracking, action recognition. And the target detection is the basic of the whole system. It can be achieved mainly by foreground segmentation on target area, and common detection methods are optical flow method, frame difference algorithm, background modeling approach, etc. The optical flow method extracts moving target by an optical flow feature, has large computation and is sensitive to noise. The frame difference algorithm can handle dynamic scene effectively by time-domain subtraction of two or three neighbor frames. And the background modeling approach segments the moving target by subtracting the current frame image and the background model and has quick calculating speed and usually can provide complete feature data.

The present methods for abandon target detection are split into two categories: non-automatic monitoring algorithm and tracking algorithm. The non-automatic monitoring algorithm includes study-based algorithm and manually setting background algorithm. The first algorithm has special requirements for features of abandon objects, so the abandon objects having different features from training samples cannot be detected accurately. The second algorithm has more limitations because empty background cannot be set under complex scene and it cannot adapt the change of light conditions. And the tracking algorithm track still targets based on background modelling. It heavily depends on effect of background model and easy to be affected by bad phenomena such as a ghost. The tracking method also has high complexity and unsatisfactory performance for long-time abandon objects.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the disclosure.

In order to solve the problem pointed out in the Background, this application provides an abandoned object detection apparatus and method and a system, so as to solve a problem of illegal road occupation identification.

According to a first aspect of the embodiments of the present disclosure, there is provided an abandoned object detection apparatus, including:

a detecting unit configured to match each pixel of an acquired current frame with its background model, mark unmatched pixels, taken as foreground pixels, on a foreground mask, add 1 to a foreground counter to which each foreground pixel corresponds, and update the background model;

a marking unit configured to, for each foreground pixel, mark a point corresponding to the foreground pixel on an abandon mask when a value of the foreground counter to which the foreground pixel corresponds is greater than a second threshold value; and a mask processing unit configured to, for each point on the abandon mask, process the abandon mask according to its background model and buffer background or foreground mask.

According to a second aspect of the embodiments of the present disclosure, there is provided a video surveillance system, including:

a video camera configured to capture a video, so as to obtain video data; and an abandoned object detection apparatus configured to process each frame of image in the video data from the video camera, so as to detect an abandoned object;

wherein the abandoned object detection apparatus comprises:

a detecting unit configured to match each pixel of an acquired current frame with its background model, mark unmatched pixels, taken as foreground pixels, on a foreground mask, add 1 to a foreground counter to which each foreground pixel corresponds, and update the background model;

a marking unit configured to, for each foreground pixel, mark a point corresponding to the foreground pixel on an abandon mask when a value of the foreground counter to which the foreground pixel corresponds is greater than a second threshold value; and a mask processing unit configured to, for each point on the abandon mask, process the abandon mask according to its background model and buffer background or foreground mask.

According to a third aspect of the embodiments of the present disclosure, there is provided an abandoned object detection method, including:

matching each pixel of an acquired current frame with its background model, marking unmatched pixels, taken as foreground pixels, on a foreground mask, adding 1 to a foreground counter to which each foreground pixel corresponds, and updating the background model;

for each foreground pixel, marking a point corresponding to the foreground pixel on an abandon mask when a value of the foreground counter to which the foreground pixel corresponds is greater than a second threshold value; and for each point on the abandon mask, processing the abandon mask according to its background model and buffer background or foreground mask.

An advantage of the embodiments of the present disclosure exists in that with the apparatus, method and system provided in this application, the buffer background of the abandoned object is provided, hence, when the abandoned object leaves and how long it stays may be judged, and interference of occlusion and ghost may also be avoided, thereby solving a problem of illegal road occupation identification.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/include/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings:

FIG. 3 is a flowchart of the abandoned object detection method of an embodiment of the present disclosure;

DETAILED DESCRIPTION

Figure 1:
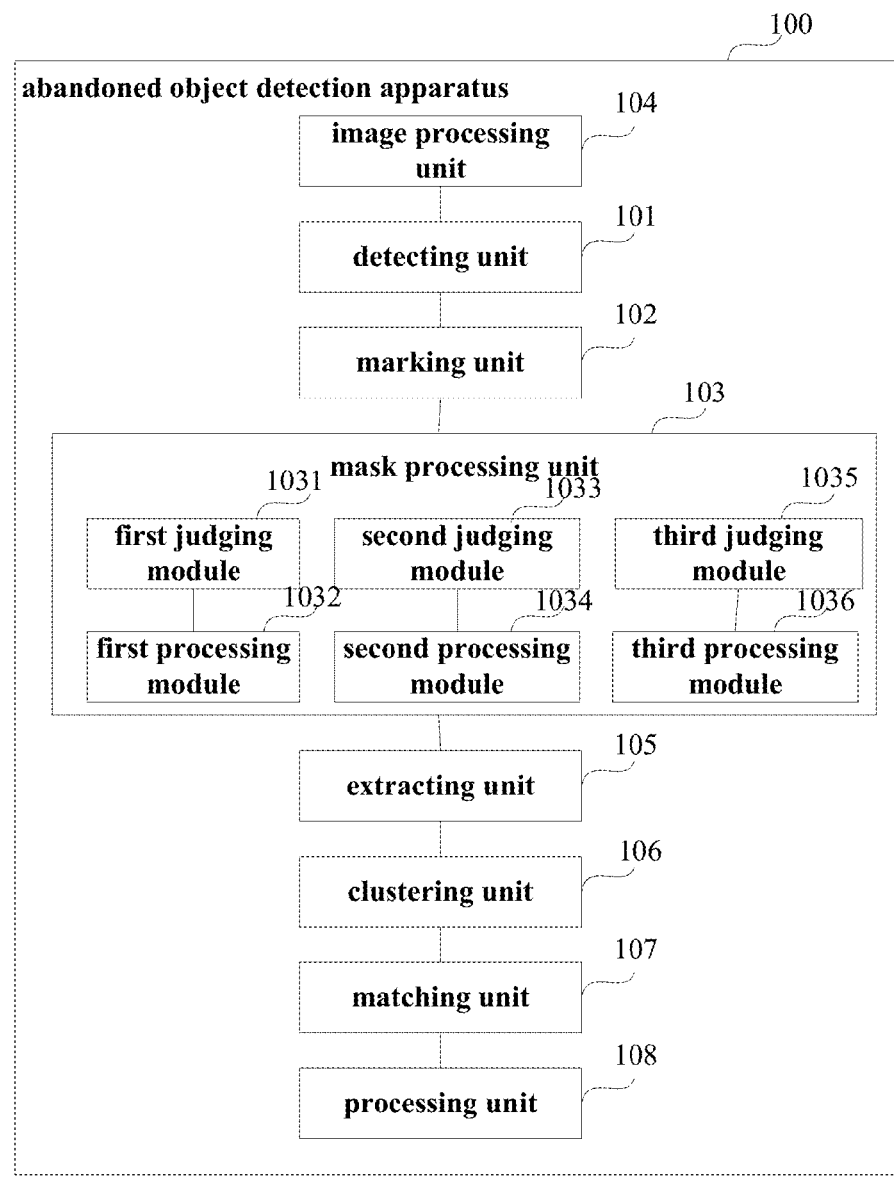
FIG. 1 is a schematic diagram of a structure of the abandoned object detection apparatus of an embodiment of the present disclosure.

Reference will now be made in detail to the embodiments, examples of which are illustrated in the accompanying drawings, wherein like reference numerals refer to the like elements throughout. The embodiments are described below by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Embodiment 1

This application provides an abandoned object detection apparatus, which processes each frame of image of a video captured by a video camera, so as to detect an abandoned object in the video. FIG. 1 is a schematic diagram of a structure of the apparatus. As shown in FIG. 1, the abandoned object detection apparatus 100 includes a detecting unit 101, a marking unit 102 and a mask processing unit 103.

In this embodiment, the detecting unit 101 is configured to match each pixel of an acquired current frame with its background model, mark unmatched pixels, taken as foreground pixels, on a foreground mask, add 1 to a foreground counter to which each foreground pixel corresponds, and update the background model.

In this embodiment, the detecting unit 101 may perform foreground detection based on the background model, and the background model may be updated based on an existing algorithm. In this embodiment, corresponding to each pixel point, the background model has a sample set, sampling values in the sample set being a pixel value of the pixel point in the past and pixel values of its neighboring points. For a pixel x(i,j) and its background model back_samples [NUM_SAMPLES] of the current frame, the detecting unit 101 may match the pixel x(i,j) with each sampling value in the background model, and records the number of matching. If the number of matching is greater than a threshold value Thre_fg, the pixel x(i,j) is deemed as a background pixel (a background point); otherwise, the pixel x(i,j) is deemed as an unmatched pixel, and is marked on the foreground mask as a foreground pixel (a foreground point).

In this embodiment, setting the foreground mask is for subsequent mask processing, which shall be described below.

In this embodiment, a foreground counter is further defined. If a pixel is judged as a foreground pixel, 1 is added to its foreground counter. A foreground counter fore_counter (i,j) of the pixel x(i,j) may be calculated according to Formula (1):

$$\text{fore\_counter}(i, j) = \sum_{k=0}^{t} |\text{foreground\_mask}_k(i, j)|. \quad (1)$$

In this embodiment, besides marking the foreground pixels on the foreground mask and updating the foreground counter to which the foreground pixels correspond, the detecting unit 101 further updates background models to which the foreground pixels correspond according to a certain condition, and the related art may be referred to for a detailed method of update.

In this embodiment, as shown in FIG. 1, the apparatus may further include an image processing unit 104 configured to process the foreground pixels by using a three-frame difference method when a frame number of the current frame is less than a first threshold value, so as to avoid an initial ghost phenomenon.

In this embodiment, for each foreground pixel, the marking unit 102 determines whether the foreground pixel is an abandon point according to a counting result of its foreground counter. In an implementation, if a value of the foreground counter to which the foreground pixels correspond is greater than a second threshold value Thre_fc, that is, the number of times of judging a pixel as a foreground is greater than a predetermined threshold value, the pixel is deemed as an abandon point, and a point corresponding to the pixel is marked on the abandon mask. In this embodiment, the abandoned mask abandon_mask(i,j) may be defined by Formula (2) below:

$$\text{abandon\_mask}(i, j) = \begin{cases} 1 & \text{fore\_counter}(i, j) > \text{Thre\_fc} \\ 0 & \text{fore\_counter}(i, j) \leq \text{Thre\_fc} \end{cases} \quad (2)$$

In this embodiment, for each point on the abandon mask, the mask processing unit 103 processes the abandon mask according to corresponding background model and buffer background or foreground mask.

In this embodiment, influence of ghost, leaving or occlusion etc. is not taken into account in the abandon mask obtained by the marking unit 102, that is, a point on the abandon mask is possibly a ghost, rather than a real abandoned object, or a point on the abandon mask has left, a point on the abandon mask is occluded. In order to avoid inaccuracy of the abandon mask due to these cases, such cases are processed by the mask processing unit 103 in this embodiment. In particular, the mask processing unit 103 may process the abandon mask according to a relationship between the background models and the buffer backgrounds of the points on the abandon mask or a relationship between the background models and foreground masks of the points on the abandon mask.

In this embodiment, the buffer background is defined for detecting when an abandoned object leaves. If the pixel x(i,j) becomes a foreground from a background, that is, the value of the foreground counter of the pixel changes from 0 into 1, the detecting unit 101 saves an average value of its background models in its buffer background buffer_background(i,j).

In an implementation, as shown in FIG. 1, in order to eliminate the influence of the ghost, the mask processing unit 103 includes: a first judging module 1031 and a first processing module 1032. The first judging module 1031 judges whether the point is a ghost point according to the background model and the buffer background of the point, and the first processing module 1032 is configured to remove the point from the abandon mask when it is judged yes by the first judging module 1031, such as setting a value of the point on the abandon mask as being 0, and reserve the point on the abandon mask when it is judged no by the first judging module 1031.

In this implementation, when an abandon point leaves, it may still stay on the abandon mask, and such a phenomenon is referred to as a ghost. In this implementation, whether a point on an abandon mask is a ghost point is determined by using a relationship between a buffer background and a background model of the abandon point. If the number of frames of a point on the abandon mask taken as an abandon point is greater than a predetermined threshold value and its buffer background matches with its current background model, that is abandon_count(i,j)>Thre_g && (buffer_background(i,j) matchwith current background(i,j)), this point is judged as a ghost point. In this implementation, once a point is judged as a ghost point, a corresponding pixel value on the abandon mask is set to be 0.

In another implementation, as shown in FIG. 1, in order to avoid inaccuracy of the abandon mask due to the leaving of the abandon point, the mask processing unit 103 may further include: a second judging module 1033 and a second processing module 1034. The second judging module 1033 judges whether the buffer background of the point matches with the current frame, and the second processing module 1034 removes the point from the abandon mask when it is judged yes by the second judging module 1033, such as setting a value of the point on the abandon mask as being 0; and reserves the point on the abandon mask when it is judged no by the second judging module 1033.

In this implementation, for an abandon pixel x(i,j), if its buffer background matches with the current frame, it means that the abandon point has left, and at this moment, the abandon mask may be updated by setting the value of the left point to be 0. Furthermore, if an abandoned object gradually goes away, its cluster on the abandon mask becomes small, hence, whether an abandoned cluster leaves may be determined by setting an area threshold value in this embodiment.

In still another implementation, as shown in FIG. 1, in order to avoid inaccuracy of the abandon mask due to that the abandon point is occluded, the mask processing unit 103 may further include: a third judging module 1035 and a third processing module 1036. The third judging module 1035 judges whether neither of pixel values to which the point corresponds on the abandon mask and the foreground mask is 0, and the third processing module 1036 reserves the point on the abandon mask when it is judged yes by the third judging module 1035, and removes the point from the abandon mask when it is judged no by the third judging module 1035, such as setting a value of the point on the abandon mask as being 0.

In this implementation, when an abandoned object is occluded by a new foreground and is not processed, the abandon mask will be incorrectly updated as being 0. Hence, in this implementation, a collision point is defined for judging whether an abandon point is occluded. For an abandon pixel x(i,j), if neither of its corresponding pixel values on the abandon mask and the foreground mask is 0, that is, following Formula (3) is satisfied, it is a collision point, and the pixel value on the abandon mask is reserved.

$$\text{abandon\_mask}(i,j)!=0 \,\&\&\, \text{foreground\_mask}(i,j)!=0 \quad (3).$$

With the above processing of the abandoned object detection apparatus of this embodiment, a true abandon mask is obtained, and abandon blobs in the current frame of image may be outlined by clustering.

Figure 2A:
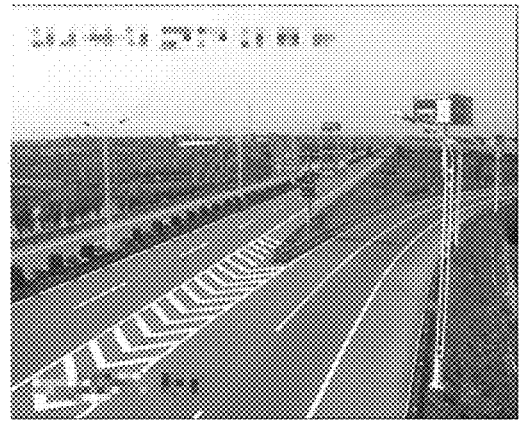
FIG. 2A is a schematic diagram of a frame of image in a video captured by a video camera.
Figure 2B:
FIG. 2B is a schematic diagram of another frame of image in the video captured by the video camera.
Figure 2C:
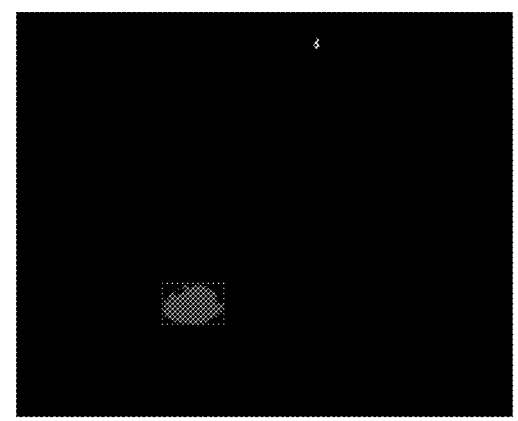
FIG. 2C is a schematic diagram of an abandon mask obtained by detecting the image shown in FIG. 2B.

FIGS. 2A and 2B are two frames of images in a video captured by a video camera. As shown in FIGS. 2A and 2B, in the frame of image shown in FIG. 2A, no vehicle is parked on the ramp, and in the frame of image shown in FIG. 2B, a vehicle is parked on the ramp, which is illegal parking. By the above processing for each frame of image of the video captured by the video camera by the abandoned object detection apparatus of this embodiment, an abandon mask shown in FIG. 2C is obtained. As shown in FIG. 2C, several abandon points corresponding to a position of the vehicle shown in FIG. 2B are marked on the abandon mask, thereby constituting an abandon area.

In this embodiment, with the above processing, basic information on the abandoned object is obtained. Hence, the number of frames of which abandoned objects stay may be counted, and what the abandoned objects are may be judged. And if a time of staying of the abandoned objects exceeds a predetermined time, warning will be given out and its type may be displayed.

In an implementation, as shown in FIG. 1, the abandoned object detection apparatus 100 further includes: an extracting unit 105, a clustering unit 106, a matching unit 107 and a processing unit 108.

The extracting unit 105 is configured to extract position features and stay time features of the points on the abandon mask.

The clustering unit 106 is configured to cluster the points on the abandon mask according to the position features and the stay time features of the points on the abandon mask, so as to obtain multiple abandon blobs.

The matching unit 107 is configured to match abandon blobs of the current frame with abandon blobs of a previous frame, mark each abandon blob with corresponding ID and count a stay time of each abandon blob.

And the processing unit 108 is configured to perform preprocessing according to the stay time of each abandon blob, such as giving out warning to a server when the stay time exceeds a threshold value.

In this implementation, if an abandoned object leaves, by the above-described processing by the abandoned object detection apparatus 100, all abandon points on the abandon mask corresponding to a position of the abandoned object are 0, and the above warning is cleared.

With the abandoned object detection apparatus of this embodiment, an occupying object may be detected in a real-time manner, which is not subjected to the influence of the update of the background model, and may be integrated into a whole intelligent transmission system with few amount of calculation.

Embodiment 2

This application provides an abandoned object detection method. As principles of the method for solving problems are similar to that of the abandoned object detection apparatus 100 in Embodiment 1, the implementation of the abandoned object detection apparatus 100 in Embodiment 1 may be referred to for implementation of the method, with identical contents being not going to be described any further.

FIG. 3 is a flowchart of the abandoned object detection method of this embodiment. Referring to FIG. 3, the method includes:

step 301: each pixel of an acquired current frame is matched with its background model, unmatched pixels, taken as foreground pixels, are marked on a foreground mask, 1 is added to a foreground counter to which each foreground pixel corresponds, and the background model is updated;

step 302: for each foreground pixel, a point corresponding to the foreground pixel is marked on an abandon mask when a value of the foreground counter to which the foreground pixel corresponds is greater than a second threshold value; and step 303: for each point on the abandon mask, the abandon mask is processed according to its background model and buffer background or foreground mask.

In this embodiment, as described above, if a frame number of the current frame is less than a first threshold value, a three-frame difference method may be used to process the foreground pixels.

In this embodiment, as described above, if the value of the foreground counter to which the foreground pixel corresponds is 1, that is, the pixel just changes from a background pixel into a foreground pixel, an average value of the background models of the foreground pixel is saved in its buffer background.

In an implementation of step 303, it may be judged whether the point is a ghost point according to the background model and the buffer background; the point is removed from the abandon mask if it is judged yes; and the point is reserved on the abandon mask if it is judged no. In this implementation, if an abandon counting result of the point (the number of frames of the point when it is judged as an abandon point) is greater than a predetermined threshold value and the buffer background of the point matches with the current background model, the point is determined as a ghost point.

In another implementation of step 303, it may be judged whether the buffer background of the point matches with the current frame; if it is judged yes, it means that the point has left and the point is removed from the abandon mask; and if it is judged no, the point is reserved on the abandon mask.

In a further implementation of step 303, it may be judged whether neither of corresponding pixel values of the point on the abandon mask and the foreground mask is 0; if it is judged yes, the point is deemed as a collision point and the point is reserved on the abandon mask, and if it is judged no, the point is removed from the abandon mask.

In this embodiment, after the abandon mask is obtained, position features and stay time features of the points on the abandon mask may further be extracted, the points on the abandon mask may be clustered according to the position features and the stay time features of the points on the abandon mask, so as to obtain multiple abandon blobs, abandon blobs of the current frame may be matched with abandon blobs of a previous frame, each abandon blob may be marked with corresponding ID and a stay time of each abandon blob may be counted, and preprocessing may be performed according to the stay time of each abandon blob, such as giving out warning when the stay time exceeds a threshold value.

Figure 4:
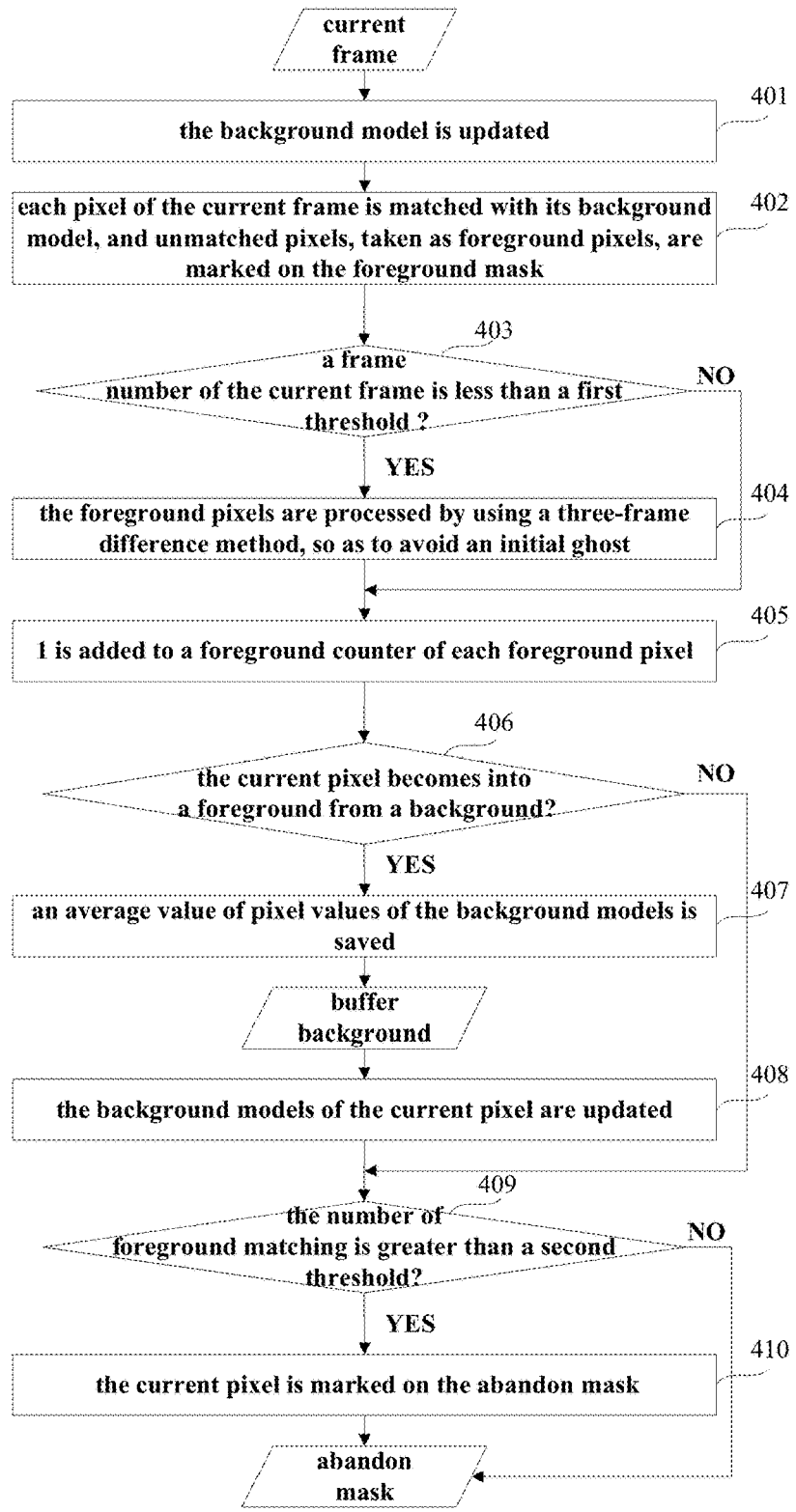
FIG. 4 is a flowchart of foreground detection and abandon mask extraction of this embodiment.

FIG. 4 is a flowchart of an implementation of foreground detection and abandon mask extraction. As shown in FIG. 4, the flow includes:

step 401: the background model is updated;

step 402: each pixel of the current frame is matched with its background model, and unmatched pixels, taken as foreground pixels, are marked on a foreground mask;

step 403: it is judged whether a frame number of the current frame is less than a first threshold value; step 404 is executed if it is judged yes; otherwise, step 405 is executed;

step 404: the foreground pixels are processed by using a three-frame difference method, so as to avoid an initial ghost;

step 405: 1 is added to a foreground counter of each foreground pixel;

step 406: it is judged whether the current pixel becomes into a foreground from a background; step 407 is executed if it is judged yes; otherwise, step 409 is executed;

wherein, if a value of the foreground counter of the current pixel is 1, it means that the current pixel just changes from a background into a foreground;

step 407: an average value of pixel values of the background models of the pixel is saved in the buffer background;

step 408: the background models of the current pixel are updated;

step 409: it is judged whether the number of foreground matching is greater than a second threshold value; step 410 is executed if it is judged yes; otherwise, the process is terminated;

wherein, the number of foreground matching is the number of times of judging the current pixel as a foreground pixel;

step 410: the current pixel is marked on the abandon mask.

The above steps and orders are illustrative only. In this implementation, as described above, some steps are not necessary, some steps conceivable to those skilled in the art may be added according to particular implementation effects based on them, and this embodiment is not limited thereto.

With the processing shown in FIG. 4, the abandon mask of the abandoned objects in the current frame of image is obtained. However, for the points on the abandon mask, not all the points are points of the abandoned objects. For example, some may possibly be ghost, some may have left, and some may possibly be occluded. And the procedure shown in FIG. 5 may be used in this embodiment to process each point on the abandon mask, so as to obtain a true abandon mask of the abandoned object.

Figure 5:
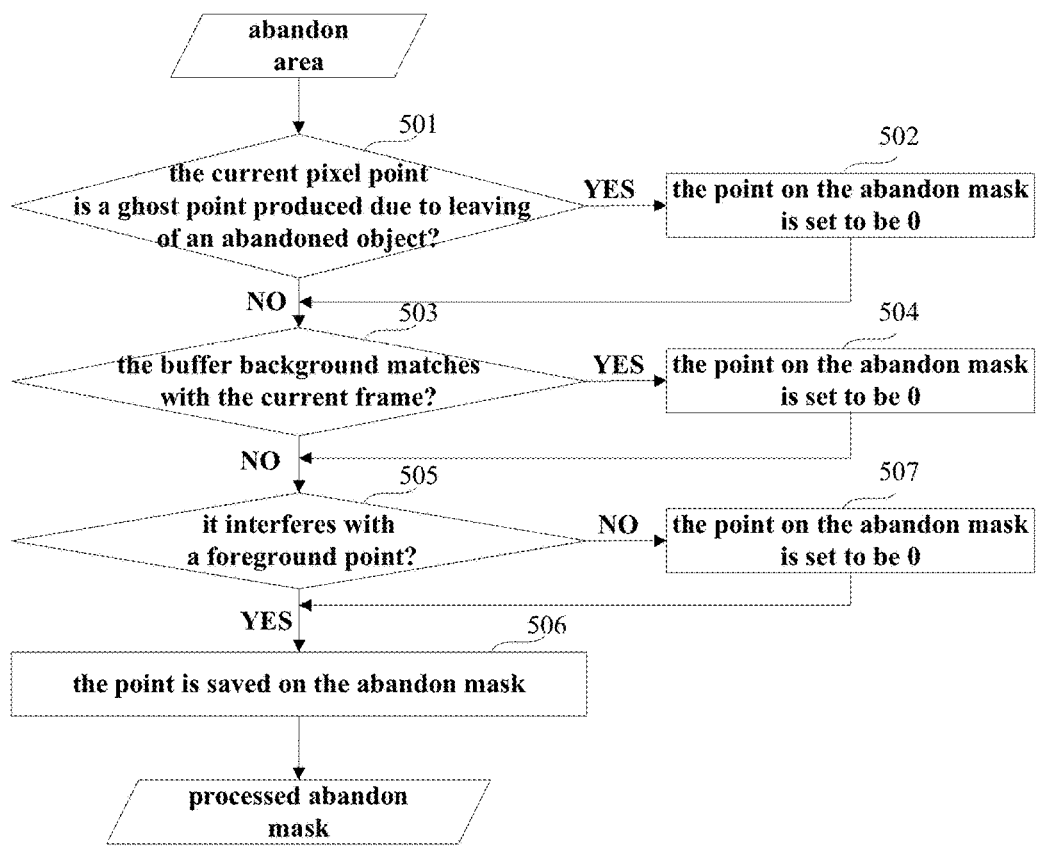
FIG. 5 is a flowchart of processing the abandon mask of this embodiment.

FIG. 5 is a flowchart of processing the abandon mask. Referring to FIG. 5, the flow includes:

step 501: it is judged whether the current pixel point is a ghost point produced due to leaving of an abandoned object; step 502 is executed if it is judged yes; otherwise, step 503 is executed;

wherein, if a counting result of abandonment of a point on the abandon mask is greater than a predetermined threshold value and the buffer background of the point matches with its current background model, the point is determined as a ghost point;

step 502: the point on the abandon mask is set to be 0;

step 503: it is judged whether the buffer background matches with the current frame; step 504 is executed if it is judged yes; otherwise, step 505 is executed;

step 504: the point on the abandon mask is set to be 0;

step 505: it is judged whether it interferes with a foreground point; step 506 is executed if it is judged yes; otherwise, step 507 is executed;

wherein, if neither of corresponding pixel values of the point on the abandon mask and the foreground mask is 0, it shows that it interferes with the foreground point, that is, this point is occluded, rather than real leaving;

step 506: the point is saved on the abandon mask; and step 507: the point on the abandon mask is set to be 0.

The above steps and orders are illustrative only. In this implementation, as described above, some steps are not necessary, and execution orders of some steps are interchangeable. For example, execution orders of steps 501, 503 and 505 may be interchangeable. And some steps conceivable to those skilled in the art may be added according to particular implementation effects based on them, and this embodiment is not limited thereto.

With the processing shown in FIG. 5, the true abandon mask of the abandoned objects is obtained.

With the abandoned object detection method of this embodiment, an occupying object may be detected in a real-time manner, which is not subjected to the influence of the update of the background model, and may be integrated into a whole intelligent transmission system with few amount of calculation.

Embodiment 3

An embodiment of the present disclosure further provides a video surveillance system, including a video camera and an abandoned object detection apparatus, the video camera being configured to capture a video, so as to obtain video data, and the abandoned object detection apparatus being configured to process each frame of image in the video data from the video camera, so as to detect an abandoned object.

In this embodiment, the abandoned object detection apparatus may be carried out by the abandoned object detection apparatus 100 in Embodiment 1. As the abandoned object detection apparatus 100 has been described in detail in Embodiment 1, the contents of which are incorporated herein, and shall not be described herein any further.

Figure 6:
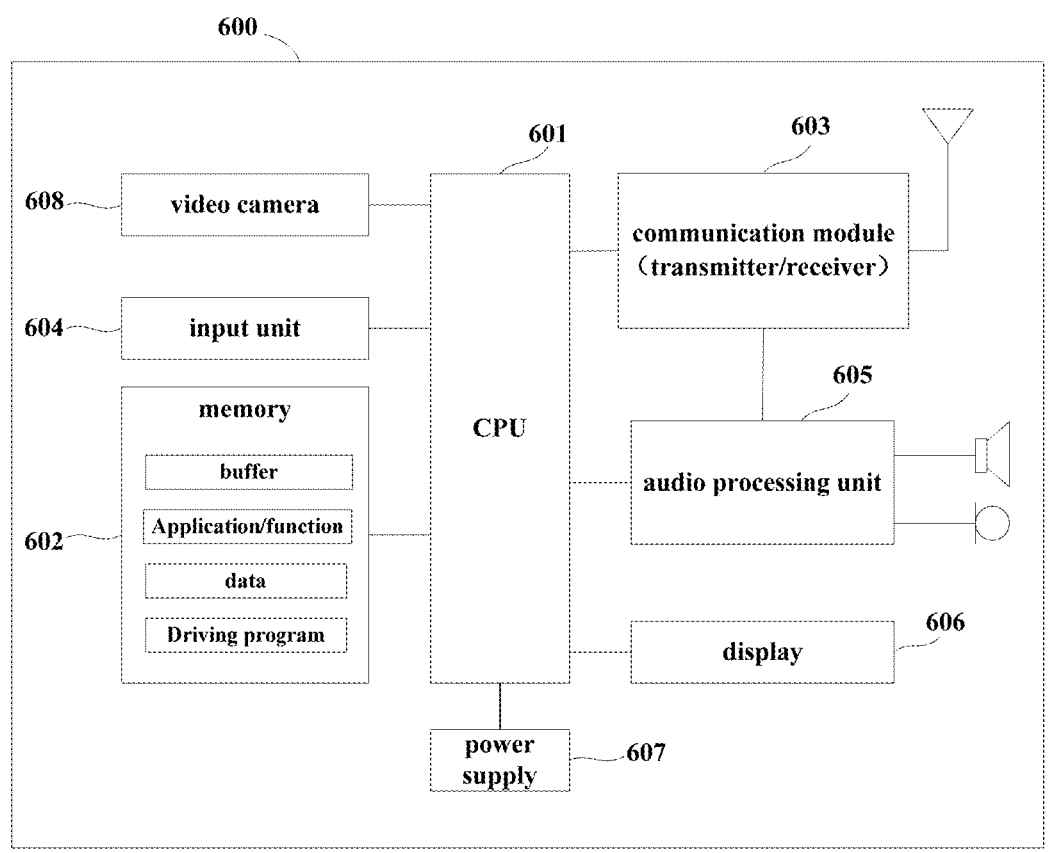
FIG. 6 is a schematic diagram of hardware structure of the video surveillance system of an embodiment.

FIG. 6 is a schematic diagram of a hardware structure of the video surveillance system of this embodiment. As shown in FIG. 6, the video surveillance system 600, essentially a computer, may include a central processing unit (CPU) 601 and a memory 602, the memory 602 being coupled to the central processing unit 601. It should be noted that this figure is illustrative only, and other types of structures may also be used, so as to supplement or replace this structure and achieve telecommunications function or other functions.

In an implementation, the functions of the abandoned object detection apparatus 100 described in Embodiment 1 may be integrated into the central processing unit 601.

In another implementation, the abandoned object detection apparatus 100 described in Embodiment 1 and the central processing unit 601 may be configured separately. For example, the abandoned object detection apparatus 100 may be configured as a chip connected to the central processing unit 601, with its functions being realized under control of the central processing unit 601.

As shown in FIG. 6, the video surveillance system 600 may further include a communication module 603, an input unit 604, an audio processing unit 605, a display 606, a power supply 607 and a video camera 608. It should be noted that the video surveillance system 600 does not necessarily include all the parts shown in FIG. 6. And furthermore, the video surveillance system 600 may include components not shown in FIG. 6, and the related art may be referred to.

As shown in FIG. 6, the central processing unit 601 is sometimes referred to as a controller or control, and may include a microprocessor or other processor devices and/or logic devices. The central processing unit 601 receives input and controls operations of every components of the video surveillance system 600.

In this embodiment, the memory 602 may be, for example, one or more of a buffer memory, a flash memory, a hard drive, a mobile medium, a volatile memory, a nonvolatile memory, or other suitable devices. It may store predefined or preconfigured information and video data captured by a video camera, and may further store programs executing related information. And the central processing unit 601 may execute the programs stored in the memory 602, so as to realize information storage or processing, etc. Functions of other parts are similar to those of the related art, which shall not be described herein any further. The parts of the video surveillance system 600 may be realized by specific hardware, firmware, software, or any combination thereof, without departing from the scope of the present disclosure.

With the video surveillance system 600 of this embodiment, an occupying object may be detected in a real-time manner, which is not subjected to the influence of the update of the background model, and may be integrated into a whole intelligent transmission system with few amount of calculation.

An embodiment of the present disclosure further provides a computer-readable program, wherein when the program is executed in a computer, the program enables a computer to carry out the method as described in Embodiment 2.

An embodiment of the present disclosure further provides a storage medium in which a computer-readable program is stored, wherein the computer-readable program enables a computer to carry out the method as described in Embodiment 2.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

Regarding implementations containing the above embodiments, following supplements are further disclosed.

Supplement 1. An abandoned object detection apparatus, including:

a detecting unit configured to match each pixel of an acquired current frame with its background model, mark unmatched pixels, taken as foreground pixels, on a foreground mask, add 1 to a foreground counter to which each foreground pixel corresponds, and update the background model;

a marking unit configured to, for each foreground pixel, mark a point corresponding to the foreground pixel on an abandon mask when a value of the foreground counter to which the foreground pixel corresponds is greater than a second threshold value; and a mask processing unit configured to, for each point on the abandon mask, process the abandon mask according to its background model and buffer background or foreground mask.

Supplement 2. The apparatus according to supplement 1, wherein the apparatus further includes:

an image processing unit configured to process the foreground pixels by using a three-frame difference method when a frame number of the current frame is less than a first threshold value.

Supplement 3. The apparatus according to supplement 1, wherein the detecting unit is further configured to save an average value of the background models of the foreground pixel in the buffer background when the value of the foreground counter to which the foreground pixel correspond is 1.

Supplement 4. The apparatus according to supplement 1, wherein the mask processing unit includes:

a first judging module configured to judge whether the point is a ghost point according to the background model and the buffer background; and a first processing module configured to remove the point from the abandon mask when it is judged yes by the first judging module, and reserve the point on the abandon mask when it is judged no by the first judging module.

Supplement 5. The apparatus according to supplement 4, wherein the first judging module judges that the point is a ghost point when an abandon counting result of the point is greater than a predefined threshold value and its buffer background matches with the current background model.

Supplement 6. The apparatus according to supplement 1, wherein the mask processing unit includes:

a second judging module configured to judge whether the buffer background of the point matches with the current frame; and a second processing module configured to remove the point from the abandon mask when it is judged yes by the second judging module, and reserve the point on the abandon mask when it is judged no by the second judging module.

Supplement 7. The apparatus according to supplement 1, wherein the mask processing unit includes:

a third judging module configured to judge whether neither of pixel values to which the point corresponds on the abandon mask and the foreground mask is 0; and a third processing module configured to reserve the point on the abandon mask when it is judged yes by the third judging module, and remove the point from the abandon mask when it is judged no by the third judging module.

Supplement 8. The apparatus according to supplement 1, wherein the apparatus further includes:

an extracting unit configured to extract position features and stay time features of the points on the abandon mask;

a clustering unit configured to cluster the points on the abandon mask according to the position features and the stay time features of the points on the abandon mask, so as to obtain multiple abandon blobs;

a matching unit configured to match abandon blobs of the current frame with abandon blobs of a previous frame, mark each abandon blob with corresponding ID and count a stay time of each abandon blob; and a processing unit configured to perform preprocessing according to the stay time of each abandon blob.

Supplement 9. A video surveillance system, including:

a video camera configured to capture a video, so as to obtain video data; and an abandoned object detection apparatus configured to process each frame of image in the video data from the video camera, so as to detect an abandoned object;

wherein the abandoned object detection apparatus includes:

a detecting unit configured to match each pixel of an acquired current frame with its background model, mark unmatched pixels, taken as foreground pixels, on a foreground mask, add 1 to a foreground counter to which each foreground pixel corresponds, and update the background model;

a marking unit configured to, for each foreground pixel, mark a point corresponding to the foreground pixel on an abandon mask when a value of the foreground counter to which the foreground pixel corresponds is greater than a second threshold value; and a mask processing unit configured to, for each point on the abandon mask, process the abandon mask according to its background model and buffer background or foreground mask.

Supplement 10. An abandoned object detection method, including:

matching each pixel of an acquired current frame with its background model, marking unmatched pixels, taken as foreground pixels, on a foreground mask, adding 1 to a foreground counter to which each foreground pixel corresponds, and updating the background model;

for each foreground pixel, marking a point corresponding to the foreground pixel on an abandon mask when a value of the foreground counter to which the foreground pixel corresponds is greater than a second threshold value; and for each point on the abandon mask, processing the abandon mask according to a relationship between its background model and buffer background or foreground mask.

Supplement 11. The method according to supplement 10, wherein if a frame number of the current frame is less than a first threshold value, the method further includes:

processing the foreground pixels by using a three-frame difference method.

Supplement 12. The method according to supplement 10, wherein if a value of the foreground counter to which the foreground pixel corresponds is 1, the method further includes:

saving an average value of the background models of the foreground pixel in the buffer background.

Supplement 13. The method according to supplement 10, wherein for each point on the abandon mask, processing the abandon mask according to a relationship between its background model and buffer background or foreground mask, includes:

judging whether the point is a ghost point according to the background model and the buffer background;

removing the point from the abandon mask if it is judged yes; and reserving the point on the abandon mask if it is judged no.

Supplement 14. The method according to supplement 13, wherein if an abandon counting result of the point is greater than a predefined threshold value and its buffer background matches with the current background model, the point is judged as a ghost point.

Supplement 15. The method according to supplement 10, wherein for each point on the abandon mask, processing the abandon mask according to a relationship between its background model and buffer background or foreground mask, includes:

judging whether the buffer background of the point matches with the current frame;

removing the point from the abandon mask if it is judged yes; and reserving the point on the abandon mask if it is judged no.

Supplement 16. The method according to supplement 10, wherein for each point on the abandon mask, processing the abandon mask according to a relationship between its background model and buffer background or foreground mask, includes:

judging whether neither of pixel values to which the point corresponds on the abandon mask and the foreground mask is 0;

reserving the point on the abandon mask if it is judged yes; and removing the point from the abandon mask if it is judged no.

Supplement 17. The method according to supplement 10, wherein the method further includes:

extracting position features and stay time features of the points on the abandon mask;

clustering the points on the abandon mask according to the position features and the stay time features of the points on the abandon mask, so as to obtain multiple abandon blobs;

matching abandon blobs of the current frame with abandon blobs of a previous frame, marking each abandon blob with corresponding ID and counting a stay time of each abandon blob; and performing preprocessing according to the stay time of each abandon blob.

Although a few embodiments have been shown and described, it would be appreciated by those skilled in the art that changes may be made in these embodiments without departing from the principles and spirit of the disclosure, the scope of which is defined in the claims and their equivalents.

The invention claimed is:

1. An abandoned object detection apparatus, configured to process each frame of an image in the video data from a video camera detecting an abandoned object and avoiding false detections of a video surveillance system, comprising:

a detecting unit configured to match each pixel of an acquired current frame with a corresponding background model, mark unmatched pixels, taken as foreground pixels, on a foreground mask, add 1 to a foreground counter to which each foreground pixel corresponds, and update the background model;

a marking unit configured to, for each foreground pixel, mark a point corresponding to the foreground pixel on an abandon mask when a value of the foreground counter to which the foreground pixel corresponds is greater than a threshold value; and a mask processing unit configured to, for each point on the abandon mask, process the abandon mask according to a corresponding background model and one of a buffer background and the foreground mask.

2. The apparatus according to claim 1, wherein the apparatus further comprises:

an image processing unit configured to process the foreground pixels by using a three-frame difference method when a frame number of the current frame is less than another threshold value.

3. The apparatus according to claim 1, wherein the detecting unit is further configured to save an average value of background models of the foreground pixel in a buffer background when the value of the foreground counter, to which the foreground pixel corresponds, is 1.

4. The apparatus according to claim 1, wherein the mask processing unit comprises:

a first judging module configured to judge whether the point is a ghost point according to the background model and the buffer background; and a first processing module configured to remove the point from the abandon mask when judged yes by the first judging module, and reserve the point on the abandon mask when judged no by the first judging module.

5. The apparatus according to claim 4, wherein the first judging module judges that the point is the ghost point when an abandon counting result of the point is greater than a predefined threshold value and the bugger background of the point matches a the current background model.

6. The apparatus according to claim 1, wherein the mask processing unit comprises;

a second judging module configured to judge whether the buffer background of the point matches with the current frame; and a second processing module configured to remove the point from the abandon mask when judged yes by the second judging module, and reserve the point on the abandon mask when judged no by the second judging module.

7. The apparatus according to claim 1, wherein the mask processing unit comprises;
a third judging module configured to judge whether neither of pixel values to which the point corresponds on the abandon mask and the foreground mask is 0; and
a third processing module configured to reserve the point on the abandon mask when judged yes by the third judging module, and remove the point from the abandon mask when judged no by the third judging module.

8. The apparatus according to claim 1, wherein the apparatus further comprises:
an extracting unit configured to extract position features and stay time features of points on the abandon mask;
a clustering unit configured to cluster the points on the abandon mask according to the position features and the stay time features of the points on the abandon mask obtaining multiple abandon blobs;
a matching unit configured to match abandon blobs of the current frame with abandon blobs of a previous frame, mark each abandon blob with corresponding ID and count a stay time of each abandon blob; and
a processing unit configured to perform preprocessing according to the stay time of each abandon blob.

9. An abandoned object detection method, configured to detect the specific location of abandoned object on each frame of an image in video data by updating abandon mask in video surveillance system, comprising:
matching each pixel of an acquired current frame with a corresponding background model, marking unmatched pixels, taken as foreground pixels, on a foreground mask, adding 1 to a foreground counter to which each foreground pixel corresponds, and updating the background model;
for each foreground pixel, marking a point corresponding to the foreground pixel on an abandon mask when a value of the foreground counter to which the foreground pixel corresponds is greater than a threshold value: and
for each point on the abandon mask, processing the abandon mask according to the corresponding background model and one of a buffer background and the foreground mask.

10. The method according to claim 9, wherein when a frame number of the current frame is less than another threshold value, the method further comprises:
processing foreground pixels by using a three-frame difference method.

11. The method according to claim 9, wherein if a value of the foreground counter to which the foreground pixel corresponds is 1, the method further comprises:
saving an average value of background models of the foreground pixel in the buffer background.

12. The method according to claim 9, wherein for each point on the abandon mask, processing the abandon mask according to a relationship between the corresponding background model and one of the buffer background and the foreground mask, comprises:
judging whether the point is a ghost point according to the background model and the buffer background;
removing the point from the abandon mask when judged yes; and
reserving the point on the abandon mask when judged no.

13. The method according to claim 12, wherein when an abandon counting result of the point is greater than a predefined threshold value and the corresponding buffer background matches with the current background model, the point is judged as a ghost point.

14. The method according to claim 9, wherein for each point on the abandon mask, processing the abandon mask according to a relationship between the corresponding background model and one of a buffer background and the foreground mask, comprises:
judging whether the buffer background of the point matches with the current frame;
removing the point from the abandon mask when judged yes; and
reserving the point on the abandon mask when judged no.

15. The method according to claim 9, wherein for each point on the abandon mask, processing the abandon mask according to a relationship between the corresponding background model and one of a buffer background and the foreground mask, comprises:
judging whether neither of pixel values to which the point corresponds on the abandon mask and the foreground mask is 0;
reserving the point on the abandon mask when judged yes; and
removing the point from the abandon mask when is judged no.

16. The method according to claim 9, wherein the method further comprises:
extracting position features and stay time features of the points on the abandon mask;
clustering the points on the abandon mask according to the position features and the stay time features of the points on the abandon mask obtaining multiple abandon blobs;
matching abandon blobs of the current frame with abandon blobs of a previous frame, marking each abandon blob with corresponding ID and counting a stay time of each abandon blob; and
performing preprocessing according to the stay time of each abandon blob.

17. A video surveillance system, comprising:
a video camera configured to capture a video obtaining video data; and
an abandoned object detection apparatus configured to process each frame of an image in the video data from the video camera detecting an abandoned object and avoiding false detections by the video surveillance system;
wherein the abandoned object detection apparatus comprises:
a detecting unit configured to match each pixel of an acquired current frame with a corresponding background model, mark unmatched pixels, taken as foreground pixels, on a foreground mask, add 1 to a foreground counter to which each foreground pixel corresponds, and update the background model;
a marking unit configured to, for each foreground pixel, mark a point corresponding to the foreground pixel on an abandon mask when a value of the foreground counter to which the foreground pixel corresponds is greater than another threshold value; and
a mask processing unit configured to, for each point on the abandon mask, process the abandon mask according to the corresponding background model and one of a buffer background and the foreground mask.

18. An abandoned object detection apparatus, configured to detect abnormal events, applied to security system and traffic monitoring system, comprising:
a computer, comprising:
a detecting unit configured to match each pixel of an acquired current frame with a background model of the acquired current frame a matched pixel, mark unmatched pixels, taken as foreground pixels, on a foreground mask, add 1 to a foreground counter to which each foreground pixel corresponds, and update the background model;
a marking unit configured to, for each foreground pixel, mark a point corresponding to the foreground pixel on an abandon mask when a value of the foreground counter to which the foreground pixel corresponds is greater than a threshold value; and
a mask processing unit configured to, for each point on the abandon mask, process the abandon mask according to a corresponding background model and one of a buffer background and the foreground mask.

19. A non-transitory computer readable medium comprising an abandoned object detection method, which configured to detect the specific location of an abandoned object on each frame of an image in video data by updating an abandon mask in video surveillance system, the method comprising;

matching each pixel of an acquired current frame with the acquired current from a background model, marking unmatched pixels, taken as foreground pixels, on a foreground mask, adding 1 to a foreground counter to which each foreground pixel corresponds, and updating the background model;

for each foreground pixel, marking a point corresponding to the foreground pixel on an abandon mask when a value of the foreground counter to which the foreground pixel corresponds is greater than a threshold value; and for each point on the abandon mask, processing the abandon mask according to a corresponding background model and one of a buffer background and the foreground mask.

\* \* \* \* \*